June 7, 1949.     J. D. CARROLL     2,472,768
MEANS FOR APPLYING AND SECURING ANTISKID CHAINS
Filed June 28, 1946     2 Sheets-Sheet 1
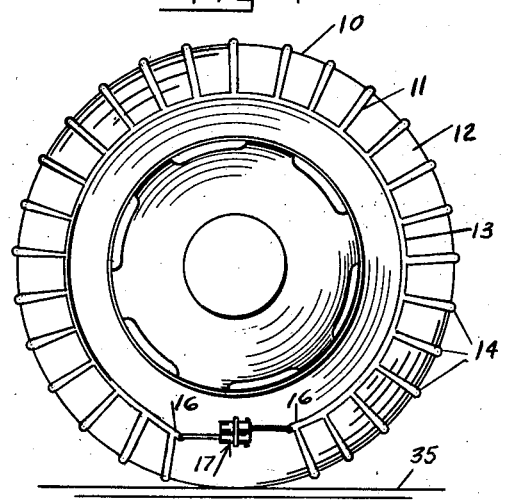
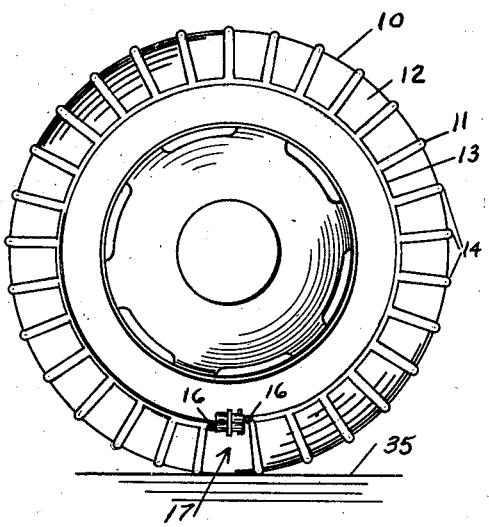
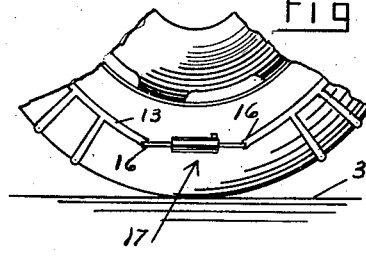
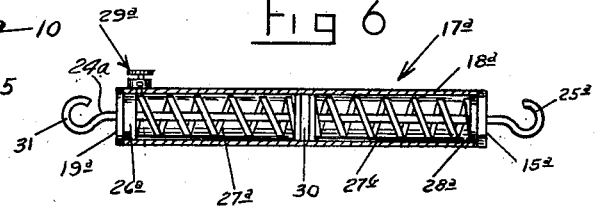
INVENTOR.
JOSEPH D CARROLL
BY
ATTORNEYS June 7, 1949.  J. D. CARROLL  2,472,768
MEANS FOR APPLYING AND SECURING ANTISKID CHAINS
Filed June 28, 1946  2 Sheets-Sheet 2
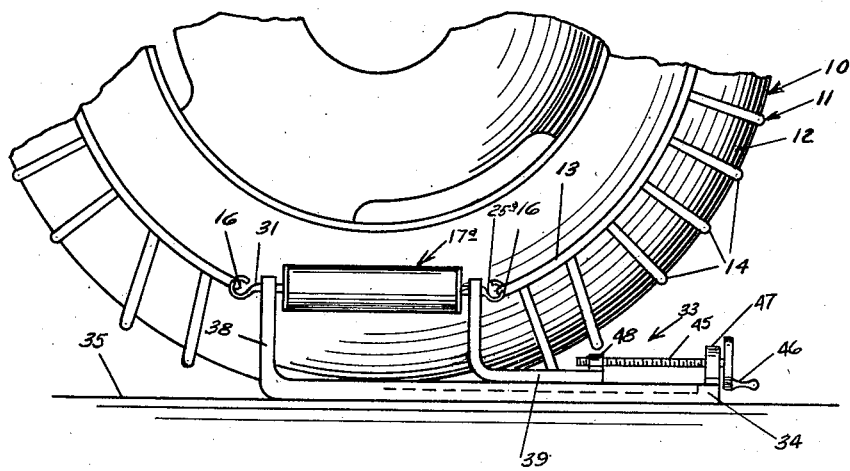
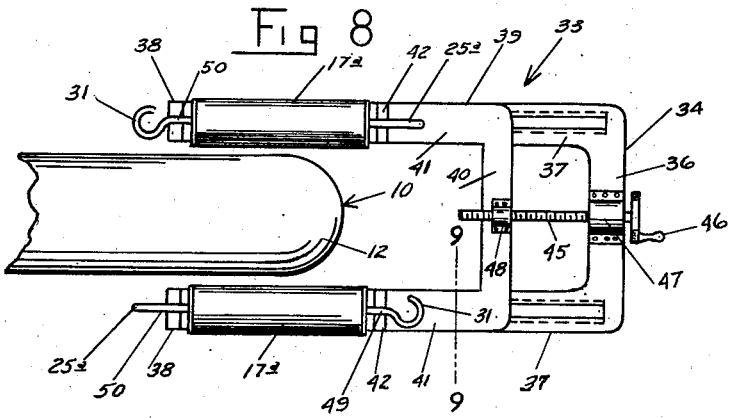
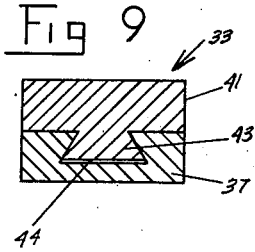
INVENTOR.
JOSEPH D CARROLL
BY
ATTORNEYS Patented June 7, 1949

2,472,768

UNITED STATES PATENT OFFICE 2,472,768

MEANS FOR APPLYING AND SECURING ANTISKID CHAINS

Joseph D. Carroll, McKeesport, Pa.

Application June 28, 1946, Serial No. 680,031

3 Claims. (Cl. 152—241)

1

This invention relates generally to means for applying anti-skid chains to vehicle wheels and securing the applied chains in place thereon without jacking up the wheels, and more particularly to contractile spring means connectible between the meeting ends of the side chains on opposite sides of the wheel, while in expanded or distended condition and adapted to be released to assume contracted condition and thereby tighten and constrict the skid chains on the wheel, together with mechanical means for expanding said contractile spring means preparatory to connecting said spring means between the adjacent ends of the side chains.

The primary object of this invention is to provide side chain connecting and constricting means of the character indicated above which greatly speeds up and facilitates the operation of applying an anti-skid chain to a wheel, and which can effectively maintain a tightened condition of the anti-skid chain during its use on the wheel.

Another important object of this invention is to provide simple and mechanically efficient contractile spring means which can be produced at relatively low cost.

Another important object of this invention is to provide simple and efficient means for expanding said contractile spring means and facilitating connection of two such contractile spring means to the anti-skid chain side chains at opposite sides of a wheel, the skid chain being draped over the top of the wheel with the free ends of the side chains hanging free near the bottom of the wheel in position for connection of said contractile spring means thereto.

Other important objects and advantages of this invention will be apparent from the following description and the accompanying drawings, wherein merely illustrative embodiments are set forth in detail.

In the drawings:

Figure 1 is a side elevation of a vehicle wheel with an anti-skid chain applied thereto, and showing the meeting ends of the side chains connected together by the novel contractile spring connectors of the dual cylinder type, said connector being shown in expanded condition.

Figure 2 is a view similar to Figure 1, showing said dual contractile spring connector in contracted condition and said anti-skid chain thereby constricted on the vehicle wheel.

Figure 3 is a fragmentary view similar to Figure 1, showing use of a single cylinder type of contractile spring connector.

Figure 4 is a side elevation on an enlarged

2 scale of one of said dual cylinder contractile spring connectors.

Figure 5 is a right hand end elevation of Figure 4.

Figure 6 is a longitudinal section taken through one of the single cylinder type contractile spring connectors.

Figure 7 is a fragmentary side elevation showing employment of the improved connector expanding and applying device.

Figure 8 is a top plan view of said device per se, and,

Figure 9 is an enlarged transverse section taken on the line 9—9 of Figure 8.

Referring to the drawings in detail, the numeral 10 generally designates a conventional pneumatic tired vehicle wheel, and the numeral 11 generally designates a conventional anti-skid chain applicable to the tire 12 of the wheel, and involving the side chains 13 encircling the wheel at the opposite sides of the tire 12, connected at intervals by cross chains 14, overlying the tire 12. The free ends of the side chains are in the form of links 16 which serve for the connection therebetween of some suitable form of contractible connector adapted to be manipulated to bring the ends of the side chains together and thereby constrict the anti-skid chain 11 on the tire 12 of the wheel 10.

In accordance with the present invention the usual or conventional side chain connectors are replaced by either of the two type forms of connectors shown per se in Figures 4 and 5, and in Figure 6, respectively.

The type of connector shown in Figures 4 and 5, which is generally designated 17, comprises a pair of relatively short cylinders 18 which have closed ends 15 and 19, respectively, and flat inner sides 20 which lie slidably against each other in the assembled position in which said cylinders extend in opposite directions. Said cylinders have registering peripheral enlargements 21 intermediate their ends which have grooves 22 to receive the legs of a U-shaped locking element 23 which locks the cylinders together against longitudinal displacement relative to each other.

Each cylinder has a plunger rod 24 working through the cylinder end 15 and provided on its outer end with a hook 25 for connecting with one of the side chain end links 16. The inner end of the rod 24 has an airtight plunger 26 working in the cylinder. An expanding helical spring 27 is circumposed on the rod 24 within the cylinder 18 between the plunger 26 and a buffer 28 at the inner side of the cylinder end 15. In relaxed or expanded condition the spring 27 positions the plunger near the cylinder end 19, as shown in Figure 4.

A manually manipulable cylinder air retaining and exhausting valve 29 which is normally closed, is mounted in communication with the interior of the cylinder 18 near the cylinder end 19. The valve 29 is adapted to be opened as the plunger rod 24 is drawn out of the cylinder and compresses the spring 27, in order to admit a body of air into the cylinder between the plunger 26 and the cylinder end 19, and then permitted to close to trap said body of air so as to prevent return of the plunger and expansion of the spring 27 until and unless the valve 27 be reopened.

Referring now to the single cylinder type of connector shown in Figure 6 of the drawings and generally designated 17a, the single relatively long cylinder 18a has closed ends 15a and 19a, respectively, with an elongated plunger rod 24a working through the cylinder end 15a and through a perforated partition 30 located midway of the interior of the cylinder, and having a plunger 26a on its inner end. Dual helical expanding springs 27a and 27b, respectively, are circumposed on the rod 24a between the plunger 26a and the partition 30, and between the partition 30 and the buffer 28a at the cylinder end 15a. A fixed hook 31 is secured to the cylinder end 19a in axial alignment with but not connected with the plunger rod 24a, for connecting with a side chain link 16.

An air valve 29a, similar to the valve 29, is mounted in communication with the interior of the cylinder 18a, and is adapted to be operated like the valve 29 as set forth in connection with the operation of the above described dual cylinders.

It will be understood that in the cases of both types of connectors disclosed herein that the plunger rods are held in the drawn out or expanded position by air trapped in the cylinders behind the pistons or plungers, and that the plunger rods are held in the indrawn or contracted position by the contractile power of the helical springs. The dash pot action of the plungers prevents violent contraction of the connectors.

It will also be understood that the connectors are applied to the side chains 13 by hooking the connector hooks into the side chain end links 16 while the connectors are in expanded condition. The valves 29 or 29a are then opened so that the retained air cushion in the cylinders escapes and the helical springs are thereby permitted to contract and tightly draw the side chain ends together, thereby forcibly constricting the anti-skid chains on the tires 12 of the wheels 10.

In order to release the dual cylinder type of connector 17 from tightening relation to a side chain 13, it is necessary only to slip off the clip 23, which permits the two cylinders 18 to separate lengthwise, thereby in effect sufficiently elongating the connector 17 to relax the side chain 13 and permit easy disconnection of the connector hooks 25 from the side chain end links 16.

In the case of the single cylinder type of connecter 17a, it is necessary, for relaxing the side chain and disconnecting the connecter hooks 25a and 31 from the side chain end links 16, to expand the connecter manually or by means of a suitable device for the purpose.

Such an expanding device is shown in Figures 7, 8 and 9 of the drawings, and is generally designated 33. Although the device 33 is shown as applied for expanding single cylinder side chain connecters 17 it is equally applicable to the dual cylinder connecters 17a.

Said expanding device comprises a U-shaped base 34, to lie on the ground 35, having the bight portion or yoke 36 from the ends of which extend forwardly the parallel legs 37 which have uprights 38 on the forward ends.

A generally U-shaped slide 39 comprises a bight portion or yoke 40 and parallel forwardly extending legs 41 having uprights 42 on their forward ends rising to the height of the upper ends of the uprights 38.

The undersides of the legs 41 have dovetail slides 43 which slide longitudinally in dovetail slots 44 formed in the legs 37 of the base 34.

A screw shaft 45 provided with a handle 46 is journalled horizontally in a bracket 47 on the bight portion 36 of the base 34 and is threaded in a bracket 48 on the bight portion 40 of the slide 39.

The upper ends of the slide uprights 42 are formed with vertical slots 49 and the upper ends of the uprights 38 with vertical slots 50, for reception of the shanks of the hooks on the opposite ends of two side chain connecters, so that the crooks of said hooks bear against the outer sides of the corresponding uprights and the connecters can be expanded by turning the screw shaft 45 in a direction to move the uprights 42 and 38 away from each other.

In using the expanding device 33 it is applied forwardly from the rear of the wheel 10 as far as it will go, with the two connecters 17 or 17a, mounted thereon at opposite sides of the wheel. The tire chain 11 having been draped over the wheel 10 with the free ends thereof dangling near the ground 35, the forward connecter hooks are engaged with the forward side chain link 16. The expanding device is then pulled rearwardly far enough to tension the hooked side of the tire chain along the forward part of the wheel. The rearward connecter hooks are then engaged with the rearward dangling side chain link 16, and the air valves 29 or 29a are then opened so as to release the contractile springs of the side chain connecters so that their contracting force is exerted principally against the device uprights 38 and 42. The screw shaft 45 is then operated to move the uprights toward each other until the progressive contracting action of the connecters pulls their hooks, connected to the chain links 16, out of the slots 49 and 50 in the uprights, whereupon the connecters fully contract and yieldably and forcibly constrict the side chains 13 around the sides of the tire 12.

It is to be observed that when the expanding means of Figures 7 and 8 is available, there is no need for valves on the cylinders, since the cylinders can by such means be held expanded until applied to the chains, and the expanding means and the cylinders can be carried in the luggage compartment of an automobile in this condition. In the event that the expanding means should be permanently fastened to the car, valves for the cylinders would be needed to keep the cylinders expanded until they were transferred from the fixed expanding means to the tire chains on the car wheels.

What is claimed is:

1. A connecter for yieldably drawing the opposed ends of a side chain, of a vehicle wheel anti-skid chain, said connecter comprising a closed dash-pot cylinder, a plunger working therein having a rod extending through the outer end of said cylinder, said rod having means for connection to one of the opposed ends of the side chain, spring means normally pressing said plunger toward the inner end of said cylinder whereby said one end of the side chain is pulled toward said cylinder, additional connecting means extending beyond said inner end of and operatively connected to said cylinder for connection to the remaining end of the side chain, and normally closed air escape valve means communicating with the interior of said cylinder, said valve when closed preventing said plunger from leaving a position adjacent to said inner end of said cylinder whereby said connecter is maintained in contracted condition, said valve when closed also preventing said plunger from leaving a position adjacent to the outer end of said cylinder, whereby said connecter is maintained in expanded condition with said spring means in compressed condition, until said valve be opened to exhaust the air accumulated in said cylinder behind said piston, and permit said spring means to contract the connecter and draw the ends of the side chain toward each other.

2. A connecter for yieldably drawing the opposed ends, of a side chain, of a vehicle wheel anti-skid chain, said connecter comprising a closed dashpot cylinder, a plunger working therein having a rod extending through the outer end of said cylinder, said rod having means for connection to one of the opposed ends of the side chain, spring means normally pressing said plunger toward the inner end of said cylinder whereby said one end of the side chain is pulled toward said cylinder, additional connecting means extending beyond said inner end of and operatively connected to said cylinder for connection to the remaining end of the side chain, and normally closed air escape valve means communicating with the interior of said cylinder, said valve when closed preventing said plunger from leaving a position adjacent to said inner end of said cylinder whereby said connecter is maintained in contracted condition, said valve when closed also preventing said plunger from leaving a position adjacent to the outer end of said cylinder, whereby said connecter is maintained in expanded condition with said spring means in compressed condition, until said valve be opened to exhaust the air accumulated in said cylinder behind said piston, and permit said spring means to contract the connecter and draw the ends of the side chain toward each other, said connecter further comprising a second closed dashpot cylinder lying alongside of and reversed with respect to the first mentioned cylinder, clip means securing said cylinders together and precluding endwise movement of said cylinders relative to each other, said second cylinder having a plunger working therein and having a rod extended through the outer end thereof in a direction opposite the plunger rod of the first cylinder and connecting means on the rod of the second plunger constituting said additional connecting means, and second spring means normally inwardly pressing the plunger of the second cylinder.

3. A connector for yieldably drawing the opposed ends of a side chain of a vehicle anti-skid chain, said connector comprising closed dashpot cylinder means, plunger means having rod means extending through outer end portions of the cylinder means and having means for connection to at least one of the opposed ends of the side chain, spring means normally pressing the plunger means away from the rod means whereby to pull the end portions of the side chain toward said cylinder means, additional connecting means extending past and operatively connected to said cylinder means for further connection to end portions of said side chain, and normally closed air-escape valve means communicating interiorly with the cylinder means, the valve means when closed serving to prevent the plunger means from leaving innermost positions within the cylinder means whereby the connector is maintained in contracted condition, the valve means when closed also preventing the plunger means from leaving outermost positions within said cylinder means, whereby said connector is maintained in expanded condition with said spring means in compressed condition, until said valve means be opened to exhaust air accumulated in the cylinder means behind said plunger means and permit said spring means to contract the connector and draw the end portions of the side chain toward each other.

JOSEPH D. CARROLL.

REFERENCES CITED

The following references are of record in the file of this patent:

UNITED STATES PATENTS

| Number | Name | Date |
| --- | --- | --- |
| 1,072,522 | Staples | Sept. 9, 1913 |
| 1,460,803 | Portzer | July 3, 1923 |
| 1,511,917 | Smith et al. | Oct. 4, 1924 |